United States Patent
Johnsson et al.

(10) Patent No.: US 10,418,717 B2
(45) Date of Patent: Sep. 17, 2019

(54) METHOD AND APPARATUS OF MAINTAINING CONSTANT ANTENNA RESONANT FREQUENCY AND IMPEDANCE MATCH IN THE PRESENCE OF ENVIRONMENTAL CHANGES AND HEAD/HAND EFFECT USING VARIABLE REACTANCE ANTENNA APERTURE TUNERS

(71) Applicant: CAVENDISH KINETICS, INC., San Jose, CA (US)

(72) Inventors: Lars Ernst Johnsson, Palo Alto, CA (US); Ray Parkhurst, Santa Clara, CA (US); Paul Anthony Tornatta, Jr., Bend, OR (US); Roberto Gaddi, Rosmalen (NL); Chenhui Niu, San Jose, CA (US)

(73) Assignee: CAVENDISH KINETICS, INC., San Jose, CA (US)

( * ) Notice: Subject to any disclaimer, the term of this patent is extended or adjusted under 35 U.S.C. 154(b) by 0 days.

(21) Appl. No.: 15/571,234

(22) PCT Filed: May 18, 2016

(86) PCT No.: PCT/US2016/033049
§ 371 (c)(1),
(2) Date: Nov. 1, 2017

(87) PCT Pub. No.: WO2016/187283
PCT Pub. Date: Nov. 24, 2016

(65) Prior Publication Data
US 2018/0277960 A1    Sep. 27, 2018

Related U.S. Application Data

(60) Provisional application No. 62/163,355, filed on May 18, 2015.

(51) Int. Cl.
| | | |
|---|---|---|
| *H01Q 19/02* | (2006.01) | |
| *H04B 1/04* | (2006.01) | |
| *H01Q 1/24* | (2006.01) | |

(52) U.S. Cl.
CPC .......... *H01Q 19/027* (2013.01); *H01Q 1/243* (2013.01); *H04B 1/0458* (2013.01); *H04B 1/0475* (2013.01)

(58) Field of Classification Search
CPC .......... H01Q 1/243; H01Q 1/24; H01Q 19/02; H01Q 19/027; H04B 1/0458; H04B 1/0475
See application file for complete search history.

(56) References Cited

U.S. PATENT DOCUMENTS 2,051,503 A  *  8/1936   Usselman ............... H03H 2/006
                                                      333/12
3,270,284 A  *  8/1966   Schanbacher ........... E05F 15/77
                                                      331/117 R (Continued)

FOREIGN PATENT DOCUMENTS

| CN | 1650469 A | 8/2005 |
| CN | 101233653 A | 7/2008 |

(Continued)

OTHER PUBLICATIONS

International Search Report and Written Opinion issued in International Application No. PCT/US2016/033049 dated Aug. 4, 2016, 12 pages.

(Continued)

*Primary Examiner* — Tho G Phan
(74) *Attorney, Agent, or Firm* — Patterson & Sheridan, LLP; Steven Versteeg

(57) ABSTRACT

The present disclosure generally relates to any device capable of wireless communication, such as a mobile telephone or wearable device, having one or more antennas. By (Continued)

applying a variable reactance (capacitive or inductive component) antenna aperture tuner within a simple, scalar antenna aperture tuning system, the maintenance of a constant antenna resonant frequency in the presence of environmental changes or head/hand effects is obtained. The variable reactance is used to adjust the resonant frequency of the antenna to stay at the desired target frequency in response to external variables that would otherwise shift the resonance away from the operating frequency of the device. Adjusting the resonant frequency of the antenna in response to externally induced changes maintains the radiating efficiency of the antenna and simultaneously avoids impedance mismatch between the antenna and the respective transmit/receive path in the radio, thereby minimizing transmission losses.

15 Claims, 14 Drawing Sheets

(56) References Cited

U.S. PATENT DOCUMENTS

| | | | |
|---|---|---|---|
| 4,015,223 A | 3/1977 | Cheze | |
| 4,335,469 A * | 6/1982 | Tharp | H03H 7/38 343/703 |
| 4,747,161 A * | 5/1988 | Hulsey | H03C 1/02 455/108 |
| 5,564,086 A * | 10/1996 | Cygan | H04B 1/0458 333/17.3 |
| 5,778,308 A | 7/1998 | Sroka et al. | |
| 7,167,135 B2 | 1/2007 | Kipnis et al. | |
| 7,215,283 B2 | 5/2007 | Boyle | |
| 7,659,793 B2 * | 2/2010 | Fukushima | H01Q 1/3275 333/17.1 |
| 8,918,067 B2 * | 12/2014 | Parker | H04B 1/0458 326/30 |
| 9,002,278 B2 | 4/2015 | Anderson | |
| 9,287,624 B2 | 3/2016 | Wan et al. | |
| 2004/0009754 A1 | 1/2004 | Smith | |
| 2011/0063042 A1 | 3/2011 | Mendolia et al. | |
| 2012/0295554 A1 | 11/2012 | Greene et al. | |
| 2013/0038502 A1 | 2/2013 | Erdem | |
| 2013/0069737 A1 | 3/2013 | See et al. | |
| 2013/0225088 A1 | 8/2013 | Anderson | |
| 2013/0271330 A1 | 10/2013 | Bishop et al. | |
| 2014/0028521 A1 | 1/2014 | Bauder et al. | |
| 2014/0167878 A1 | 6/2014 | Lee | |
| 2015/0109176 A1 | 4/2015 | Wan et al. | |

FOREIGN PATENT DOCUMENTS

| | | |
|---|---|---|
| CN | 103297077 A | 9/2013 |
| CN | 103378417 A | 10/2013 |
| CN | 103716064 A | 4/2014 |
| CN | 103858341 A | 6/2014 |
| CN | 103975482 A | 8/2014 |

OTHER PUBLICATIONS

Office Action cited in corresponding Chinese Patent Application No. 201680028484.8, dated May 22, 2019 (26 pages).

Search Report issued in corresponding Chinese Patent Application No. 2016800284848, May 8, 2019 (6 pages).

* cited by examiner

METHOD AND APPARATUS OF MAINTAINING CONSTANT ANTENNA RESONANT FREQUENCY AND IMPEDANCE MATCH IN THE PRESENCE OF ENVIRONMENTAL CHANGES AND HEAD/HAND EFFECT USING VARIABLE REACTANCE ANTENNA APERTURE TUNERS

BACKGROUND

Field

Embodiments of the present disclosure generally relate to any device with a wireless modem, such as a mobile telephone or a wearable device, having one or more antennas to support the wireless communication of the device with the corresponding wireless network, further referred to simply as a device.

Description of the Related Art

In an ideal world, a device always receives a strong, constant signal. To this point in time the strength of a wireless signal is typically always changing, and the ideal world for a device can only be found in "free space", where the device is suspended in air without movement and without any physical interaction with a human being. Since actual use of a device typically requires physical interaction between the user and the device the ideal free space condition only exists at fabrication facilities and testing facilities. Once in operation and in the hands of the user, the device will experience changes in the signal environment, for example the so-called head/hand effect, caused by the proximity of the user to the device.

The head/hand effect refers to the change in the electrical characteristics of the antenna of the device, typically caused by capacitive loading of the antenna due to the proximity of the user's human tissue. In free space there is no user, but in practical usage there is almost always a user. The moment the user physically interacts with the device or comes close to the device, the electrical characteristics of the antenna change. Hence, the antenna of the device, once in operation, rarely operates with the ideal electrical characteristics that are achieved and measured during production, by means of calibration, typically performed in free space.

When the electrical characteristics of the antenna change due to environmental or head/hand effects, the antenna's ability to properly transmit/receive a wireless signal can be severely impacted, which can lead to dropped connections, missed calls, messages not sending/receiving, and disruptions of data traffic and internet operation. This performance degradation is due both to changes in the antenna's radiated performance as well as changes to the impedance the antenna presents to the transmit/receive signal paths in the device.

Therefore, there is a strong need to maintain the antenna's radiation and impedance characteristics during operation, and compensate for any changes thereof caused by interaction with the user and/or changes in the environment.

SUMMARY

The present disclosure generally relates to a device, such as a mobile telephone or a wearable device, having one or more antennas to support the wireless communication of the device with the corresponding wireless network. By applying a variable reactance (with capacitive and/or inductive component(s)) antenna aperture tuner to an antenna, and combining it with a simple, scalar reflected power measurement system, an antenna that can maintain its resonant frequency and impedance in the presence of environmental or head/hand effects is obtained. The variable reactance is used to offset environmental or head hand effect changes to the electrical characteristics of the antenna that would otherwise shift the antenna's resonant frequency. Maintaining the resonant frequency of the antenna in the presence of externally induced changes of the antenna's electrical characteristics has two major advantages. Firstly, the radiating efficiency of the antenna is maintained, and secondly, an impedance mismatch between the antenna and the respective transmit/receive path in the radio is avoided. By avoiding an impedance mismatch between the antenna and the rest of the radio, signal strength losses in the transmission lines are avoided, as is the need for dynamic impedance mismatch corrections in the feedline between the antenna and the remainder of the radio front end, using traditional transmission line impedance matching methods. In one embodiment, a device comprises a radio front end; an antenna; a power coupler in the transmission line between the antenna and the radio front end; and a reactance altering device coupled to the antenna.

In another embodiment, a device comprises a radio front end, an antenna, a power coupler in the transmission line between the antenna and the front end, and a reactance altering device coupled to the antenna; where detecting a simple change in reflected power from the antenna is used for a closed-loop control process of changing the reactance in the reactance altering device.

In a further embodiment, a device comprises a radio front end, an antenna, a proximity sensor or electrical field sensing device of any kind, and a reactance altering device coupled to the antenna; where detecting a change in proximity or electrical field is used to control the process of changing the reactance in the reactance altering device.

Any of the aforementioned embodiments may or may not contain a fixed or variable impedance matching network in the transmission line between the antenna and the radio front-end as those may be desired for technical reasons other than those driving the disclosure described herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to a device, such as a mobile telephone or a wearable device, having one or more antennas to support the wireless communication of the device with the corresponding wireless network. By applying a variable reactance (capacitive or inductive component) antenna aperture tuner within a simple, scalar reflected power measurement system, a closed-loop method of maintaining constant antenna resonant frequency and impedance is obtained. The variable reactance is used to adjust the electrical characteristics of the antenna in response to external variables which would otherwise shift its resonant frequency, such as environmental and head/hand effects. Adjusting the reactance of the antenna in order to maintain a constant resonant frequency of the antenna in the presence of external changes will maintain the antenna radiating efficiency and avoid a mismatch between the antenna impedance and the impedance of the transmit/receive path in the radio front-end, thereby avoiding: degradations in the antenna's radiated performance, reduced performance of the transmit/receive components in the radio front-end, and transmission losses caused by the impedance mismatch between the antenna and the radio front-end, all of which the environmental changes or head/hand effect would otherwise induce.

Figure 1:
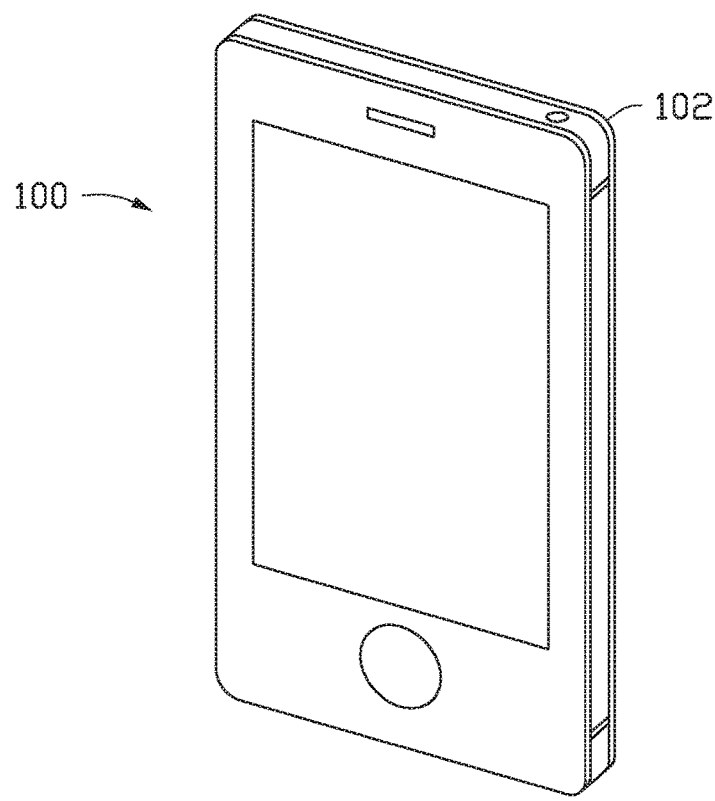
FIG. 1 is a schematic illustration of a device, in this example a cellular telephone, in free space.

FIG. 1 is a schematic illustration of a device 100 in free space, where the device has one or more antennas. The device 100 has at least one antenna 102 that may be external to the device body. It is to be understood that the antenna 102 is not limited to being external. Rather, the antenna 102 may be disposed inside the device body. The device 100 may be used to send/receive emails, voice calls, text messages, and data such as internet webpages and apps through any wireless connection, such as but not limited to a cellular service that utilizes the various frequency bands allocated for 2G, 3G, 4G LTE (long term evolution), etc, and/or WiFi, Bluetooth, NFC to name a few other wireless connection types. As shown in FIG. 1, the device 100 is in free space where no other objects, such as a human being, is disposed at a location to interfere with the device 100 operation. As the human being interacts with the device 100, however, the head/hand effect appears and the electrical characteristics of the antenna 102 changes.

Figure 2:
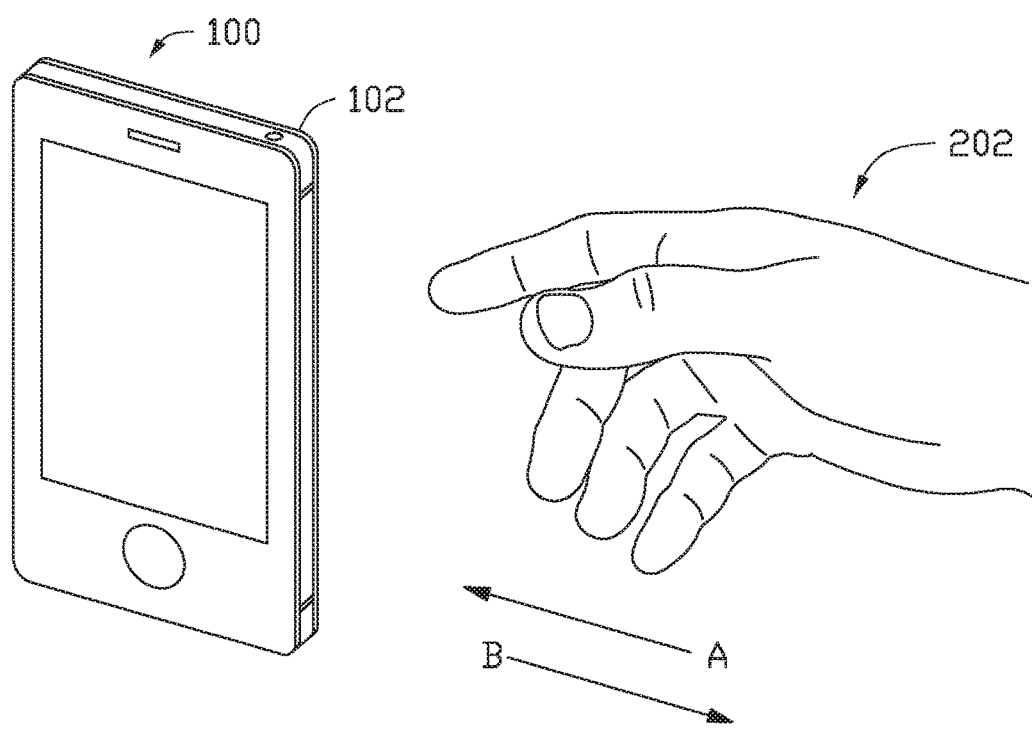
FIG. 2 is a schematic illustration of a device, in this example a cellular telephone, with a hand nearby, where the hand is a placeholder for any kind change in the electrical environment that can impact the electrical characteristics and operation of the antenna.

FIG. 2 is a schematic illustration of a device 100 with a hand 202 nearby. Hand 202 exemplifies one of many possible forms of environmental interactions device 100 is exposed to during operation, which can have an effect on the electrical characteristics of the antenna 102. As the hand 202 moves closer to the device 100 as shown by arrow "A", the electrical environment of the antenna 102 changes. Specifically, the hand 202 typically adds a capacitive load that shifts the resonant frequency of the antenna 102, but the electrical characteristics can change in other ways such as a reduction in the capacitive load or changes in the antenna's inductive load. A similar effect occurs when the device 100 nears the user's head (not shown), is placed on a physical object or in proximity to moving objects, all of which can disturb the electrical characteristics of the antenna 102. As the hand 202 moves away from the device 100 as shown by arrow "B", the electrical characteristics of the antenna 102 change yet again. Specifically, the removal of the hand typically removes a capacitive load that again shifts the resonant frequency of the antenna 102, but other changes in the reactive loading of the antenna are also possible. In actuality, moving the hand 202 away from the device 100 returns the electrical characteristics of the antenna 102 back close to the original condition, where the resonant frequency returns to the state that existed prior to the disturbance of its electrical characteristics. Depending on the specifics of the environment and its changes, and the user's head/hand interaction with device 100 during operation, the changes in the electrical environment of device 100 can represent a change in the inductance of antenna 102, although in the majority of cases the changes will result in a change in capacitance.

Figure 3:
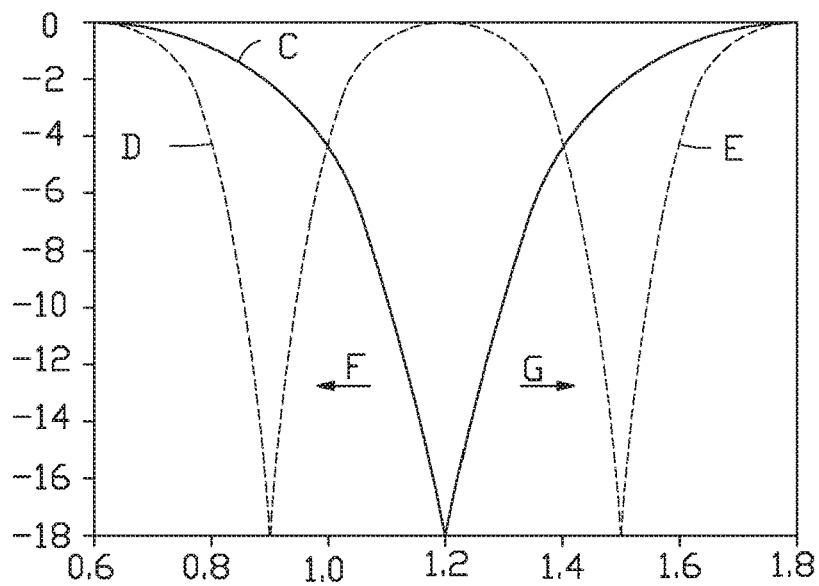
FIG. 3 is a graph showing return loss (aka reflected power ratio) measurements of the antenna of a device and the changes in the antenna's resonant frequency due to changes in its electrical characteristics caused by environmental changes of the head/hand effect, typically experienced as an increase or decrease of the antenna's capacitive or inductive loading.

FIG. 3 is a graph illustrating how a change in the electrical environment of antenna 102 will change its resonant frequency. RF engineers typically referred to this plot as S11 'return loss' measurement. The return loss indicates how much of a given amount of signal power that is being transferred from one part of the radio (for example a transmission line) to another part of the radio (for example the antenna) is being returned/reflected to its source, due to the impedance of the transmission line not being exactly the same as the impedance of the antenna, which is often referred to as impedance mismatch. These return loss plots are scalar in nature, and therefore do not contain the relative phase information between the incident and reflected signal powers. Curve "C" illustrates the return loss of the antenna 102 in free space. In the given example in FIG. 3 the return loss expressed by Curve "C" is smallest at 1.2 GHz, which typically corresponds to the resonant frequency of the antenna 102, the state of antenna 102 where most of the incoming energy is subsequently radiated. Curve "D" illustrates the return loss of the antenna 102 when the head/hand effect has changed, in this example increased, the capacitance of antenna 102, which typically leads to a down shift of the resonant frequency of antenna 102, as indicated by Arrow "F". Once the electrical changes caused by the head/hand effect have been compensated by means of the appropriate adjustment to the antenna's reactive aperture tuning component, or if the environmental disturbance has disappeared such as the head/hand having been physically removed from antenna 102, the return loss of antenna 102 will return to the state depicted by Curve "C". Similarly Curve "E" illustrates the return loss of the antenna 102 when the head/hand effect has changed, in this case decreased, the capacitance of antenna 102, which typically leads to an up-shift of the resonant frequency of antenna 102, as indicated by Arrow "G".

Consider now a different situation where the return loss changes of antenna 102 shown in FIG. 3 are caused by inductance changes instead of capacitance changes. The down shift in resonant frequency expressed in the return loss Curve "D" could be caused by a decrease of inductance instead of the more typical increase of capacitance caused by the head/hand effect. Similarly the up shift in resonant frequency expressed in the return loss Curve "E" could be caused by an increase of inductance, a likely effect if the device is placed on a metal surface for example, instead of the more typical decrease of capacitance caused by the removal of the head/hand disturbance.

Solving the antenna 102 performance impact caused by the head/hand effect has been a longstanding goal in the industry. Unable to devise a method to maintain a constant resonant frequency of antenna 102 researchers have instead worked for years to develop solutions to match the impedance of the transmission line to the changing impedance of the antenna. Practical impedance matching solutions to date have been implemented in the antenna feed line between the antenna and the radio front end, to create a variable match between the fixed impedance of the radio front end (typically 50Ω) and the variable impedance of the antenna, which depends on the changing electrical conditions the antenna is exposed to during operation. Typical impedance matching solutions use a network of fixed and variable inductors and/or capacitors, some of which may be switched or switchable, where the matching network is inserted into the feed line such that the signal traveling in the 50Ω feed line can be efficiently matched into the variable impedance of the antenna. To dynamically create the right impedance match requires the measurement of the relative amplitude and phase between the forward and reflected power waves going toward and being partially reflected from the antenna. This information is then used to derive the antenna load impedance and calculate the required adjustments to the variable capacitive and inductive components of the matching network (i.e., variable reactances) to match the changing load impedance of the antenna to the desired fixed value of the feed line, usually 50 ohms.

Impedance matching typically has the following disadvantages: requires a multi-element adjustable inductance/capacitance 'matching network' to achieve wide adjustment range; the matching network adds loss to the transmit path that reduces available transmit power and system efficiency even in conditions where there is no or little impedance mismatch; requires fast and accurate amplitude and phase detection; requires complex algorithm and significant DSP resources to calculate required impedance matching network element values; generally requires numerous iterations and adjustments to multiple circuit elements to achieve desired load impedance; wrong settings for the impedance matching network elements can lead to significant, unintended radiated performance losses that can cause dropped calls; and consumes significant time to achieve desired load impedance (>100 ms, equivalent to 10+3GPP LTE frames).

Figure 4:
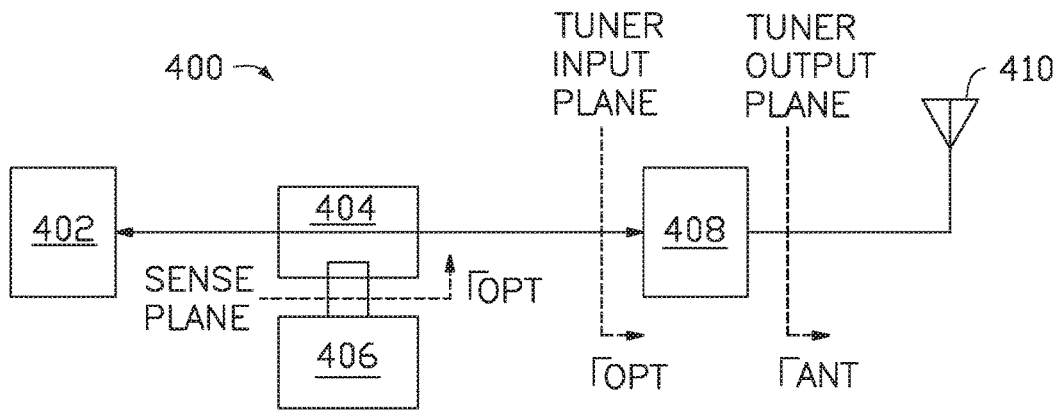
FIG. 4 is a schematic illustration of a device with an impedance matching network in the transmission line between the antenna and the radio front-end.

FIG. 4 is a schematic illustration of a device 400 with an impedance matching network. The impedance matching network 408 is inserted into the feed line because environmental changes or head/hand effect will change the electrical characteristics of the antenna 410, which typically leads to a change of the antenna's impedance, which creates an impedance mismatch between the antenna and the feed line. The impedance matching technique only reduces the aforementioned impedance mismatch, but impedance matching does not alter the electrical characteristics of the antenna itself. Therefore impedance matching is unable to correct the resonant frequency of antenna 410, which will remain shifted away from the original resonant frequency in the presence of environmental changes or head/hand effect, even if the impedance of the feed line has been matched to the changed impedance of the antenna. The device 400 includes a transmitter 402, a power amplitude and phase sensor for the forward and reflected power comprised of sensor 404 and processor 406, where those functions may or may not be performed by the same physical device. The adjustable impedance matching network 408 and antenna 410. In operation, an impedance mismatch is detected by measuring the amplitude and phase of a transmitted signal in the sensor 404. To correct for the impedance mismatch, complex conjugate match calculations are performed using the measured amplitude and phase of the forward and reflected power to determine the correct impedance matching network variables that are required to a match the impedance. The calculations are time consuming and error prone, where wrong adjustments of the impedance matching network can increase the impedance mismatch, further weakening the wireless signal. Additionally, the presence of the adjustable matching network 408 results in a permanent insertion loss that typically reduces the signal strength by more than 1 dB. Thus, there is a permanent loss in signal strength due to the insertion of the impedance matching network, caused by the hardware components required to perform the impedance matching network operation, a positive gain from impedance matching cannot be realized until the recoverable loss in signal strength caused by the impedance mismatch between antenna and the radio front end exceeds the insertion loss caused by the matching network itself.

Rather than trying to match the changing antenna impedance caused by the changing electrical environment experienced by the antenna, and performing unnecessarily complex measurements and conjugate calculations to create that impedance match, a far simpler, faster and better solution is to maintain a constant resonant frequency at the antenna, which in turn ensures that the antenna impedance will remain reasonably constant, thus completely avoiding the need for an adjustable impedance matching network.

Figure 5:
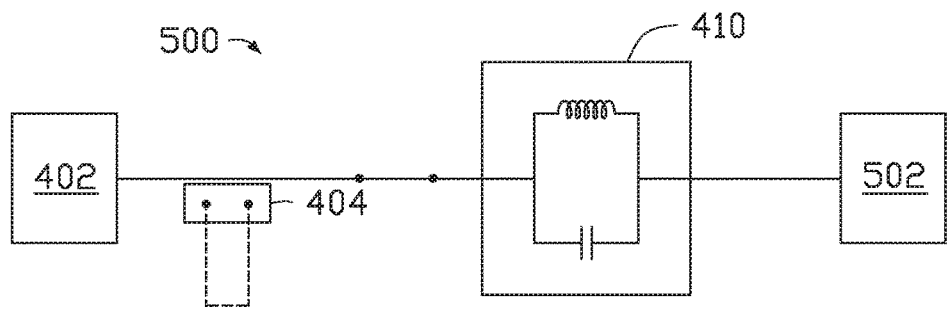
FIG. 5 is a schematic illustration of a device having a reactance adjustment device attached to the aperture of the antenna (shown here as a simplified LC resonator), according to one embodiment.

FIG. 5 is a schematic illustration of a device 500 having a radio front end that enables the antenna 410 to maintain constant resonant frequency by means of variable reactance adjustment device 502, according to one embodiment. In contrast to an impedance matching solution, maintaining a constant resonant frequency requires only the simple measurement of the reflected power at the power coupler 404, without needing to also measure and calculate the signal phase. Once the reflected power is known, the resonant frequency of the antenna 410 is determined by comparing the measured value with the original value obtained during the calibration of the antenna in free space. If the reflected power measured by power coupler 504 is different than the reflected power measured during calibration at the frequency of operation, then the resonant frequency of the antenna 410 has shifted away from the targeted operating frequency, which correlates directly to a change in the electrical characteristics of antenna 410. Such changes of the antennas electrical characteristics during operation are typically caused by environmental changes or the head/hand effect, and in the overwhelming majority of all such changes is caused by capacitive loading of the antenna due to the presence of human tissue during phone use and handling. Thus the starting assumption for the cause of a measured change in the antenna's reflected power is capacitive loading of the antenna caused by environmental and/or head/hand effects. The device 500 in FIG. 5 is able to maintain a constant resonant frequency by simply removing a predetermined amount of capacitance in one embodiment, where the right amount of capacitance to be removed is established during production calibration. Other obvious methods to maintain a constant resonating frequency are to adjust the variable reactance attached to the antenna appropriately, countering increased capacitive loading (or decreased inductive loading) with a removal of capacitance (or an increase in inductance), and countering reduced capacitive loading (or increased inductive loading) with an increase of capacitance (or a decrease in inductance). The calibration that determines appropriate adjustments to the variable reactance typically starts in free space and then adds various, industry standard head/hand phantoms to measure the change in reflected power at a given operating frequency caused by the head/hand effect. Antenna efficiency measurements can be used to determine the threshold at which a certain reflected power change corresponds to an undesirable change in the antenna's efficiency. The recorded values are stored in look-up tables that will be part of the control loop for the variable reactance in combination with the reflected power measurements. This method to adjust the variable reactance is referred to as threshold monitoring feedforward algorithm in the context of this disclosure.

In one embodiment, the variable reactance used to tune the resonant frequency of the antenna 410 is a Digitally Variable Capacitor 502, a DVC. It is to be understood that other reactance (capacitance or inductance) adjusting devices can be used to maintain a constant resonant frequency of antenna 410, in addition to or as an alternative to the DVC embodiment of device 502.

There are several advantages of maintaining a constant resonant frequency of the antenna rather than trying to match its changing impedance: maintains antenna radiation efficiency in the presence of environmental or head/hand disturbances of the electrical characteristics of the antenna; requires only a single, variable reactance; requires only scalar reflected power measurement of the transmitted signal (which can be complemented or substituted with the readings from a proximity or electrical field sensor); can be implemented with simple, robust "threshold monitoring feedforward algorithm", "IQ waveform discrimination algorithm", or "discrete discrimination algorithm"; enables extremely quick compensation of detected changes in the electrical characteristics of the antenna (<<10 ms) such that the resonant frequency does not noticeably shift and the subsequent radiation efficiency degradation and impedance mismatch do not reach performance impacting levels; requires only the variable reactance value of the antenna tuner to be adjusted; eliminates the need to determine the signal phase and eliminates associated phase measurement accuracy and impedance trajectory concerns; and eliminates insertion losses stemming from the variable impedance matching network in the feed line.

The device 500 operates by simply measuring the reflected power and then adjusting the reactance of the antenna 410 accordingly, which can be accomplished within 100 micro seconds or less when using a DVC embodiment. This is significantly faster than the 100+ milli seconds typically required for the complex phase and power vector calculations to determine the antenna impedance and derive the conjugate match of the impedance matching network in the transmitter 402, and the multiple iterations typically required until the best configuration for the variable matching network is found that provides optimal power transfer into the changed antenna impedance load.

Figure 6:
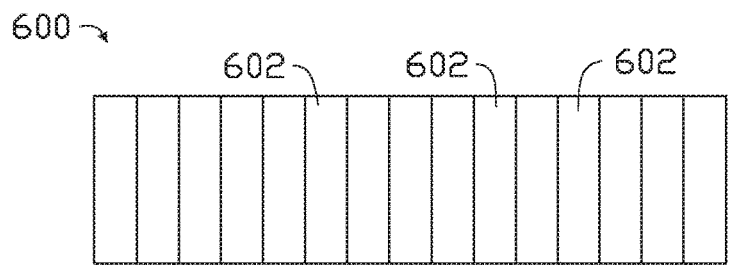
FIG. 6 is a schematic illustration of the physical layer frame of a wireless communications signal.

FIG. 6 shows a typical Physical Layer frame of a 3GPP standards based wireless communications protocol like 4G LTE, for example, where a frame is 10 ms long and has 20 slots of 500 micro second duration. This means that impedance matching takes as many as 5 or more full LTE frames to make a single impedance match correction while reactance adjustments to the antenna aperture can be performed multiple times in a single slot, if the environmental changes require such fast adjustments to avoid corruption of the transmitted data inside the frame, that would lead to the subsequent 'packet loss' that precipitates a 'dropped connection'. Fast and accurate response to environmental or head/hand changes are another key advantage that aperture tuning has over impedance matching.

Figure 7:
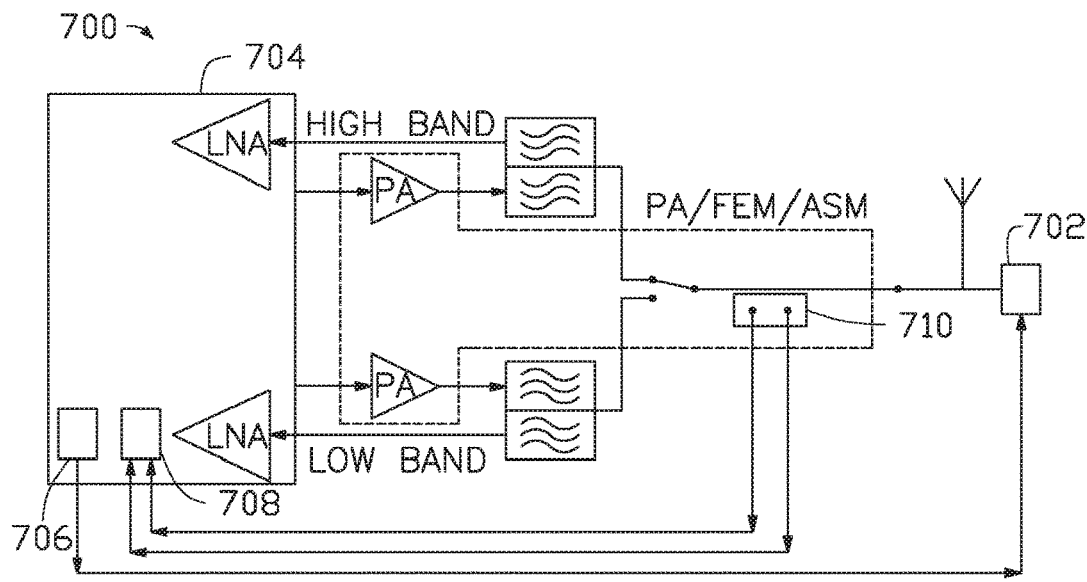
FIG. 7 is a schematic illustration of a simplified block diagram of a device having a reactance adjusting device attached to the aperture of the antenna, according to another embodiment.

FIG. 7 is a schematic illustration of a device 700 having a variable reactance adjusting device 702 where the variable reactance adjusting device can, among others, be embodied as a be a variable MEMS capacitor, a variable ferro-electric capacitor, a number of MEMS switched inductive and/or capacitive reactive elements, or a number of semiconductor switched inductive and/or capacitive reactive elements. The device includes a transmitter 704 including a variable reactance control engine 706 and measurement signal monitoring unit 708 and a reactance adjustment control signal sensor 710 is inserted in the feed line. The variable reactance control engine 706 comprises a general compute unit or Digital Signal Processing resource and memory for the algorithms and to store calibration, threshold, and measured values, to facilitate the execution of the proposed "threshold monitoring feedforward algorithm", "IQ waveform discrimination algorithm", or "discrete discrimination algorithm". The variable reactance control engine 706 can be a virtual engine running inside an existing multi-purpose processor or the modem baseband, or it can be a standalone micro-controller. The reactance adjustment control signal sensor 710 can be the shown directional power coupler in the antenna feed line to measure the forward and reflected power of the transmitted wireless signal, or it can be a capacitive touch or any kind of proximity sensor that can reliably measure presence of human tissue or other environmental changes, or it can be any other kind of electrical field sensor that can reliably measure the presence of human tissue or other environmental changes in the electrical field surrounding the device 700. The measurement signal monitoring unit 708 will have the required inputs and capabilities to process the measurement signals provided by the respective reactance adjustment control signal sensor 710. In addition a switch is present to move the wireless signal between the high band and low band radio chains of the device, as needed. The necessary reactance adjustment for the variable reactance adjusting device 702 is determined by variable reactance control engine 706 based on the measured signals from the measurement signal monitoring unit 708. The variable reactance control engine 706 adjusts the capacitive/inductive loading of the antenna in accordance with the type of variable reactance adjustment device 702 based on the algorithmic analysis of the measured signals as provided by the measurement signal monitoring unit 708, to offset the detected changes in the electrical characteristics of the antenna, which will maintain the resonant frequency of the antenna at or very near to the desired operating frequency for the wireless communication. Depending on the type of control algorithm implemented in the variable reactance control engine 706, this process can run continuously, at pre-determined, recurring time intervals, when measured signals pass threshold values programmed during calibration, or until no changes to the electrical conditions at the antenna have been detected for a reasonable amount of time, which can be pre-programmed during calibration.

Figure 8A:
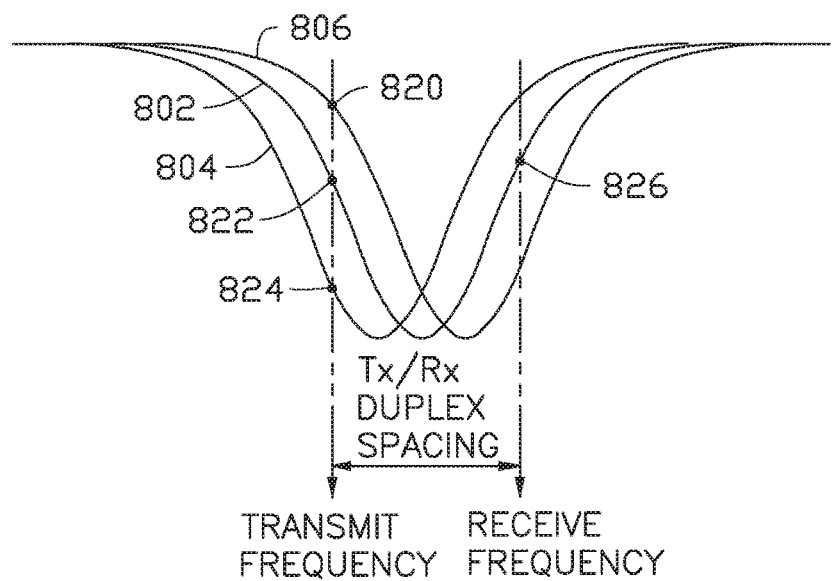
FIG. 8A shows the return loss plots of one antenna operated at 3 different resonant frequencies.
Figure 8B:
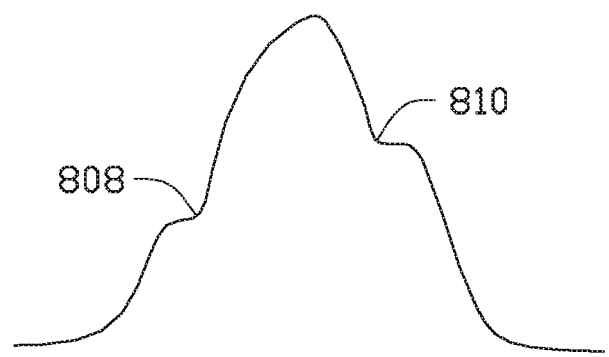
FIGS. 8B-8D are schematic illustrations of the different waveforms of the one antenna for the three different resonant frequencies.
Figure 8C:
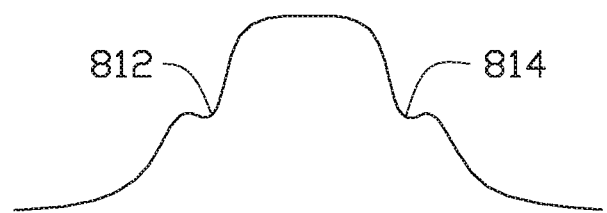
Figure 8D:
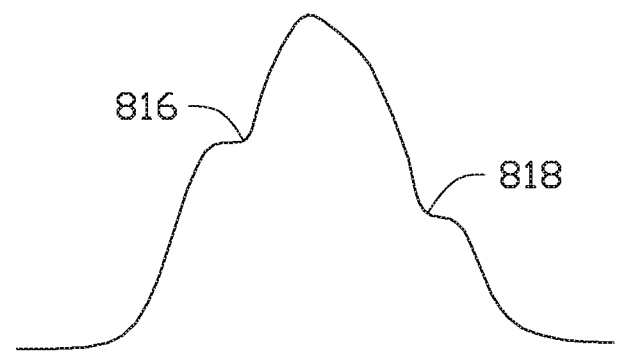

FIGS. 8A-8D are schematic illustrations of an IQ spectral envelope discrimination algorithm for the closed-loop control of the variable reactance aperture tuning solution, triggered by reflected power changes and driven by comparison of the transmitted spectral envelope with the reflected spectral envelope. As shown in FIG. 8A, plotting the antenna return loss versus frequency shows the targeted resonant frequency in curve 802, a down-shifted resonant frequency in curve 804 and up-shifted resonant frequency in curve 806. The potential capacitive or inductive environmental and head/hand effect changes that can cause such down-shift or up-shift in an antenna's resonant have been described above in the context of FIG. 3. The low value occurs when capacitance has been added (or inductance removed) to the antenna while the high value occurs when capacitance has been removed (or inductance added) from the antenna. FIGS. 8B-8D show three sketches of a wireless signal spectral envelope transmitted over the same antenna but operated at the three different antenna conditions corresponding to the return loss plots 802, 804 and 806 as depicted in FIG. 8A. FIG. 8C shows the spectral envelope as transmitted when the transmission frequency equals the antennas resonant frequency 802. The spectral envelope is symmetric with sidebands 812 and 814 at the low end and high end of the band. FIG. 8B shows the same spectral envelope but now reflected from the antenna where the resonant frequency has shifted down (curve 804 in FIG. 8A), and this spectral envelope shows a characteristic deformation where the lower sideband 808 is noticeably lower than upper sideband 810. FIG. 8D shows the same spectral envelope but now reflected from the antenna where the resonant frequency has shifted up (curve 806 in FIG. 8A), and this spectral envelope shows a characteristic deformation where the upper sideband 818 is noticeably lower than lower sideband 816. The distorted shape of the reflected spectral envelopes can be analyzed by means of processing the demodulated IQ spectral envelope. The resulting information about the slope of the distorted RF spectral envelope caused by the resonance being above or below the transmit frequency can be utilized as a discriminator to control the direction of changes in the adjustable reactance used for aperture tuning with the goal of maintaining a constant antenna resonant frequency that prevents degradations in antenna efficiency and impedance mismatch losses in the signal transmission.

Returning to FIG. 8A also allows the explanation of the discrete discrimination algorithm for the closed-loop control of the variable reactance aperture tuning solution. The return loss at the operating frequency is measured and compared against set points 822, 826 established during calibration. The calibration set point 822 is established such that both the transmit signal and the receive signal have a sufficiently low return loss, corresponding to good radiating characteristics of the antenna. As can be seen by the very typical shape of the return loss curve 802 it resembles a valley with a low floor, indicating low return loss, and more or less symmetrical side bands sloping up to the regions of high return loss, which indicate insufficient radiating characteristics of the antenna, which should be avoided during operation. Since the vast majority of all 2G, 3G and 4G communication networks assigns separate, closely spaced frequencies for the transmit and receive signals, with a typical 'duplex spacing' of 30 MHz to 90 MHz, the calibration set point for the return loss of the transmit signal is usually not the lowest return loss near the center of the valley in curve 802, but rather a point in the mid range of the side wall, picked such that the return loss of the transmit signal, usually corresponding to the left side wall at the lower frequency, and the return loss of the receive signal are in a similar range, to ensure equally efficient signal transmission and reception. Looking at such mid point on the left side wall of return loss curve 802 it is easy to see that a measurably lower return loss 824 at the same frequency would mean that the that resonant frequency of the antenna has shifted down, as indicated by curve 804. Such down shifting of the antenna's resonant frequency is typically observed during capacitive loading/inductive unloading caused by the head/hand/environmental effects. Although the lower return loss at the transmit frequency is generally desirable it has to be considered that the return loss at the receive frequency has dramatically increased for curve 804, which could lead to a loss of the receive signal. The opposite effect is observed when the antenna is exposed to inductive loading/capacitive unloading from environmental/head/hand effects and the resonant frequency of the antenna shifts up to point 820, as indicated by curve 806. Now the return loss at the transmit frequency has significantly increased while the return loss at the receive frequency is significantly lower, indicating stronger receive signal at the expense of a much weaker transmit signal. No matter what kind of antenna loading and resonant frequency shifting occurs the overall efficiency of the antenna for signal transmit and receive is degrading, and a simple discrete discrimination algorithm can maintain constant resonant frequency of the antenna as follows:

1. If the calculated set point return loss plus/minus sensitivity margin is greater/smaller than the measured return loss then decrease/increase capacitive loading (increase/decrease inductive loading) through the variable reactance by a small, fixed amount determined during calibration.
2. If the calculated set point return loss plus/minus sensitivity margin is still greater/smaller than the measured return loss then decrease/increase capacitive loading (increase/decrease inductive loading) further by the same small, fixed amount determined during calibration until the measured return loss falls within the return loss of the cal set point plus/minus sensitivity margin.
3. Continue to measure return loss and compare with the return loss of the calculated set point plus/minus the sensitivity margin until the measured return loss falls outside the return loss of the cal set point plus/minus sensitivity margin, proceed with step 1 in that case.

FIGS. 11-24 exemplify one embodiment for adjusting the capacitance of a device to compensate for the head/hand effect.

The magnitude of the reflection coefficient (RC) is a function of frequency $f$, equivalent capacitance $C_0$ and equivalent inductance $L_0$.

$$RC(f, C, L) = RC\left(2\pi f * C_0 - \frac{1}{2\pi f * L_0}\right)$$

The resonant frequency $f_0$ is:

$$f_0 = \frac{1}{2\pi\sqrt{L_0 C_0}}$$

The antenna equivalent inductance $L_0$ of the antenna is usually constant, so the reflection coefficient magnitude of the antenna is a function frequency $f$ and equivalent capacitance $C_0$.

$$RC = RC\left[2\pi f_0 * C_0 * \left(\frac{f}{f_0} - \frac{f_0}{f}\right)\right]$$

Figure 11:
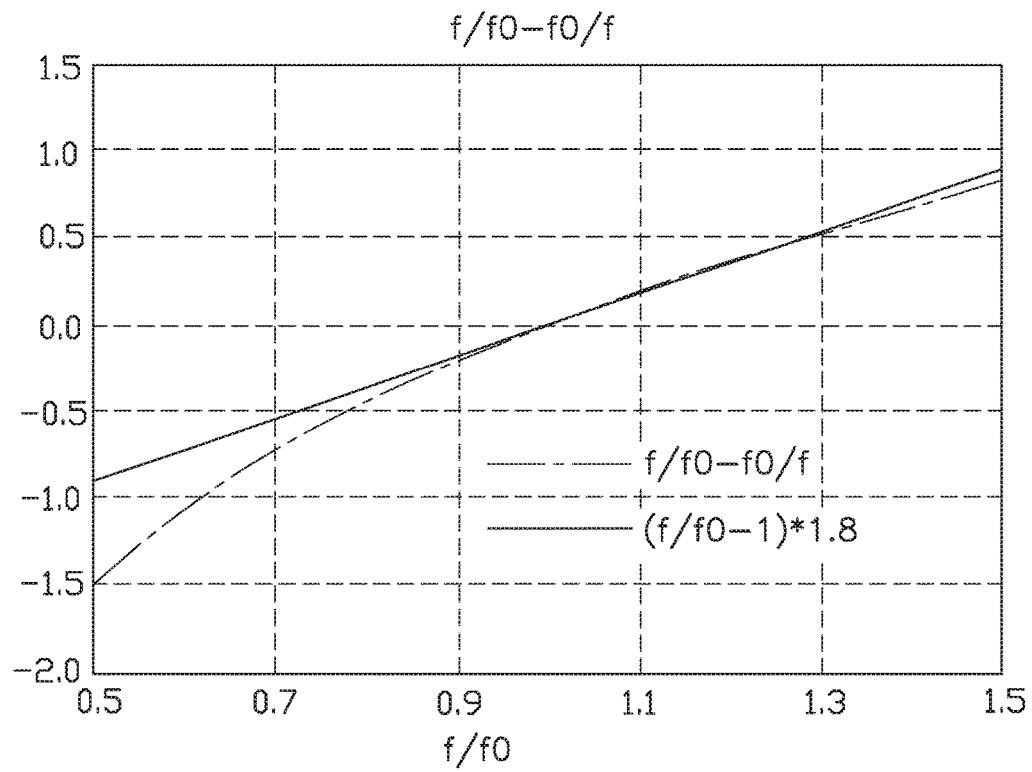
FIGS. 11-24 exemplify one embodiment for adjusting the capacitance of a device to compensate for the head/hand effect.

When the frequency range is around the resonant frequency of the antenna, the $$\left(\frac{f}{f_0} - \frac{f_0}{f}\right)$$

part is smooth and close to linear, as shown in FIG. 11.

As a result, the reflection coefficient magnitude response versus the equivalent capacitance has the similar shape of the antenna's frequency response. When the equivalent capacitance is tuned by a digital variable capacitor (DVC) with a constant step size, $C_0+n*\Delta C$, the equivalent capacitance is linearly mapped to the DVC state. Therefore the reflection coefficient magnitude response versus DVC state has the similar shape of the antenna's frequency response too.

Figure 12:

FIG. 12 presents an example of a PIFA antenna tuned by a DVC 402R measured at 800 MHz. The antenna is tuned from 750 MHz to 950 MHz, and it is tuned to 800 MHz with DVC at state 20. The DVC state response measured at 800 MHz resembles the frequency response at DVC state #20. In FIG. 12, the upper limit is predetermined in the free state and is the calculated reflection power that the device can withstand. The lower limit is predetermined during device calibration with the device in the free state. The optimized state is the location on the graph where the transmit and receive reflection coefficient magnitudes are substantially identical. Therefore, by measuring the antenna at a fixed frequency versus DVC state, we can get a good understanding of the antenna frequency response. For example, in FIG. 12 when the uplink frequency is 45 MHz lower than the downlink frequency, the optimized state is at the left side slope state #15, with reflection coefficient magnitude ~0.4.

Reflection Coefficient Threshold

To keep both up-link and down-link well matched, the magnitude of the reflection coefficient at uplink should not be too low. Like DVC state #20 in FIG. 12, up-link reflection coefficient magnitude is 0.1 while down-link reflection coefficient magnitude goes up to 0.6. Therefore the magnitude of the reflection coefficient of up-link has both upper and lower limit. Both going too high or too low will trigger an optimization operation.

Monitor Reflection Coefficient Over Time

Figure 13:
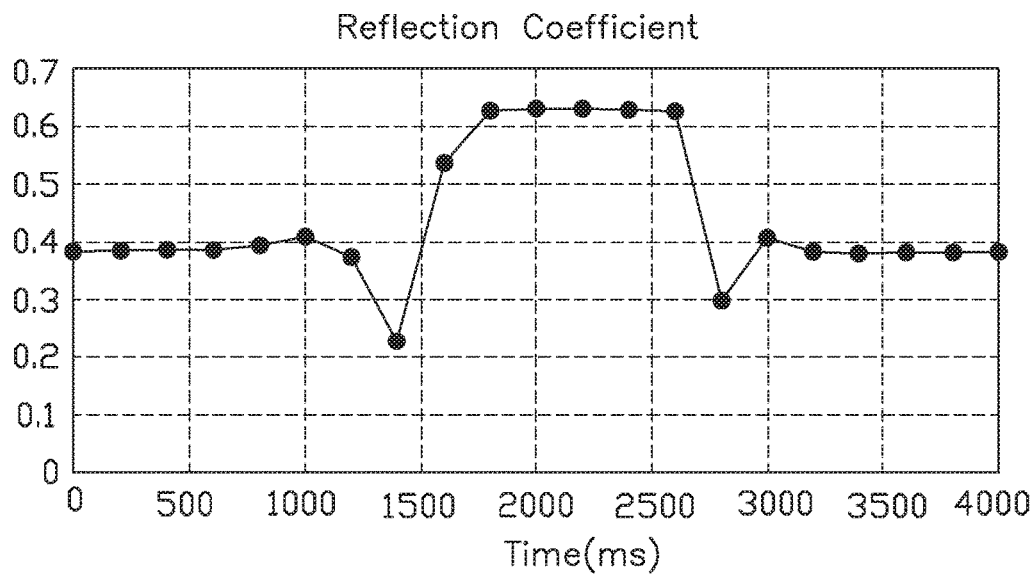

When the antenna is at the optimized state (#15 in FIG. 12), a typical hand loading and release impact on reflection coefficient magnitude is shown in FIG. 13. The capacitive hand loading moves the magnitude of the reflection coefficient to a higher loading state. For example, hand loading capacitance could be equivalent to DVC going from state #15 to state #18, #21 and #24 and will make reflection coefficient magnitude go down first and then go up. By checking the change of reflection coefficient magnitude over time, one can detect hand loading and release events, even if the reflection coefficient is not breaking the threshold.

Figure 14:
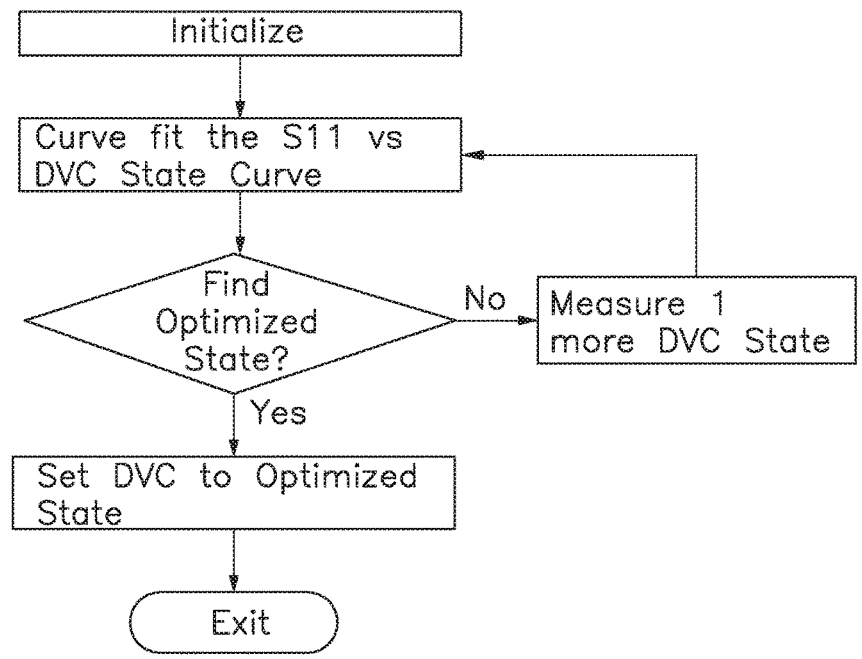

FIG. 14 shows the control flow of the optimization algorithm. The optimization is triggered by threshold breaking and/or dip detection, along with some knowledge of the hand loading/release condition. The optimization algorithm collects data sets of the magnitude of the reflection coefficient versus DVC state. The optimization estimates the reflection coefficient magnitude versus DVC state response and checks if the optimized state is found. If the optimized state is found, the algorithm exits with potential threshold tweak. If the optimized state is not found, the algorithm goes back to the reflection coefficient magnitude measurement iteration. For each new reflection coefficient magnitude versus DVC state data point collected, the algorithm runs the estimation and check again. The data sets used in the demo code are: the measured DVC states [S]=[S0, S1, S2, ..., Sn]; and the magnitude of the reflection coefficient at the measured DVC state [RC]=[RC0, RC1, RC2, ..., RCn].

Initialize

Figure 15:
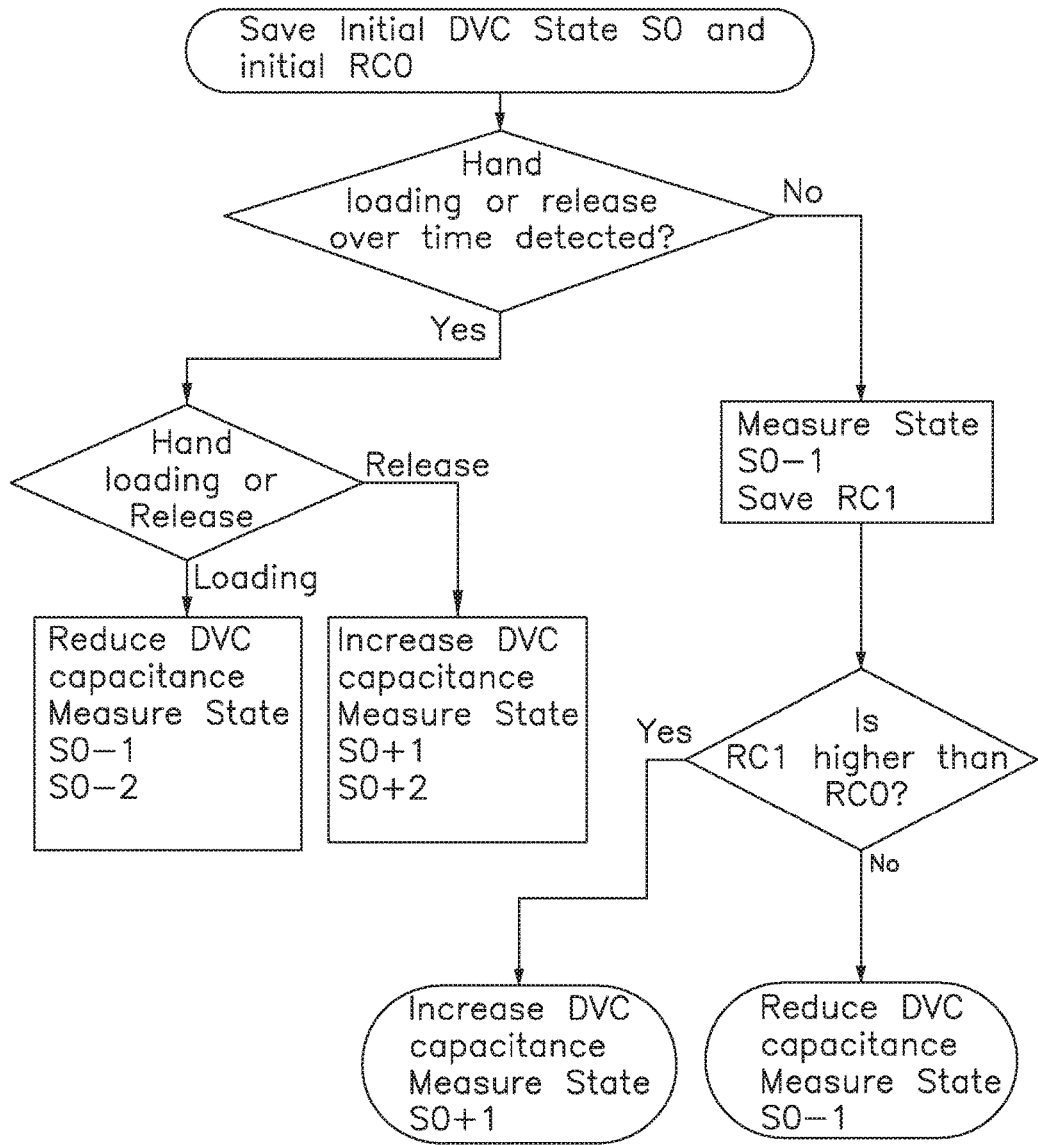
Figure 16:
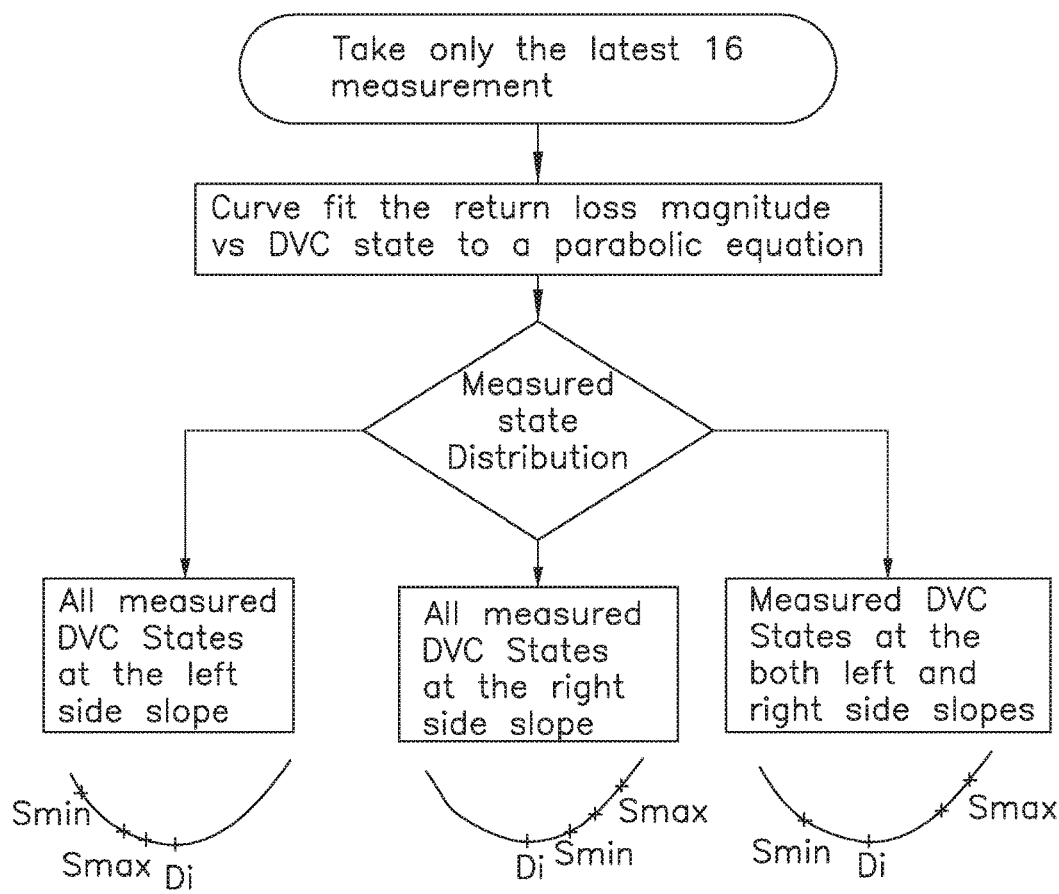

The curve estimation step usually takes more than 1 data point to work, so the Initialize step is needed to take the first set of data points to initiate the iteration. Three data points are collected before starting the optimization, as shown in FIG. 15. The initial DVC state is S0 and the initial reflection coefficient magnitude is RC0. If the loading condition is known to the algorithm, the algorithm will move the DVC to counter the impact of the loading. With hand loading, the algorithm will measure S0−1 and S0−2 to reduce capacitance. With hand releasing, the algorithm will measure S0+1 and S0+2 to increase capacitance. If the loading condition is not known, the algorithm will reduce the DVC capacitance for one step and measure the reflection coefficient magnitude (RC1) at the new state. If RC1 is higher than the initial reflection coefficient magnitude RC0, the 3rd data point will be at S0+1. Otherwise, the $3^{rd}$ data point will be at S0−1.

Curve Fit Reflection Coefficient Magnitude Versus DVC State

Firstly the data set is truncated, if necessary, and only the latest sixteen measurements are used in the fitting. It is to be understood that measurements may be taken more or less frequently, typically in 'time slot' increments, 10 ms in the case of LTE. If a measurement is taken every ~40 ms, then the latest 600 ms would be considered to be 'recent'. After truncation, the measured lowest DVC state is defined as Smin. The measured highest DVC state is defined as Smax. The code fits the RC=f(S) curve to a parabolic function.

$$RC = aS^2 + bS + c, \ a > 0$$

It is a simplified relationship. More complicated fitting that takes loading information and antenna model into consideration could be used to treat more complicated situation. The minimum reflection coefficient magnitude DVC state on the fitted parabolic curve is 'Di' in FIG. 16.

$$Di = -\frac{b}{2a}$$

Figure 18:
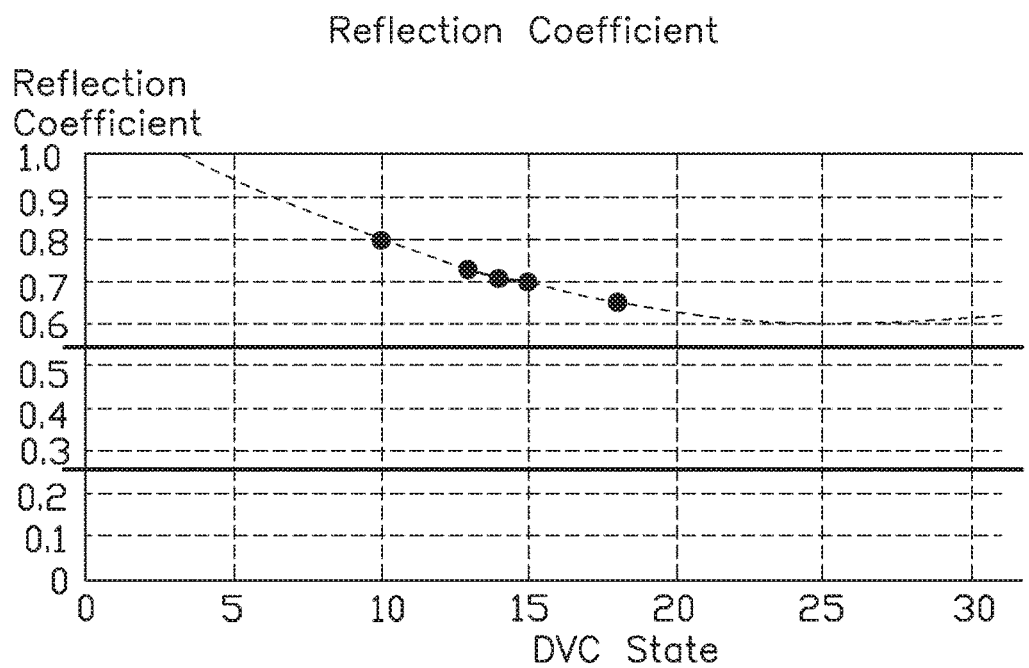

By the distribution of the measured DVC states, there are 3 branches in the "looking for the optimized state" step, as shown in FIG. 18. First, all measured DVC states at the left side of the slope: Smax≤Di. Second, all measured DVC states at the right side of the slope: Di≤Smin. Third, Resonant state found: Smin<Di<Smax.

Looking for the Optimized DVC State

Figure 17:
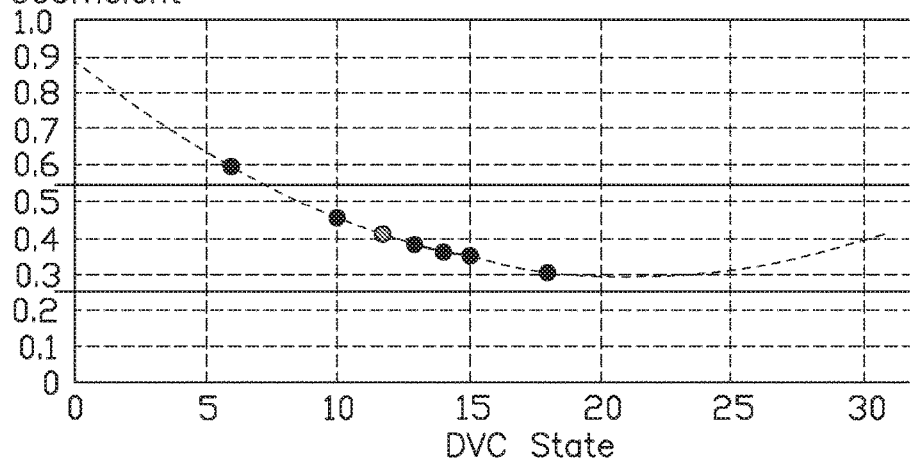

In one example, all measured DVC states are at the left side of the slope as shown in FIG. 17. FIG. 17 shows an example where there are measured DVC states in the threshold state. The algorithm calculates the optimized state by the fitting parabolic equation. In FIG. 17 case, DVC State #12 is the calculated best state. In the situation where DVC state #12 is not measured in the FIG. 17 case, the algorithm will report optimized state not found and set DVC state #12 to be the next DVC state to measure. If DVC state #12 was measured, then the algorithm will return DVC state #12 as the optimized state and exit.

In another example, all measured DVC states are higher than the upper limit as shown in FIG. 18. If Smax<31, the algorithm will report optimized state not found and set Smax+1 to be the next DVC state to measure. If Smax=31, the algorithm will report optimized state=31 and exit. New threshold will be set according to reflection coefficient magnitude as DVC State 31. The DVC capacitance is not large enough to tune the antenna down in this case.

Figure 19:
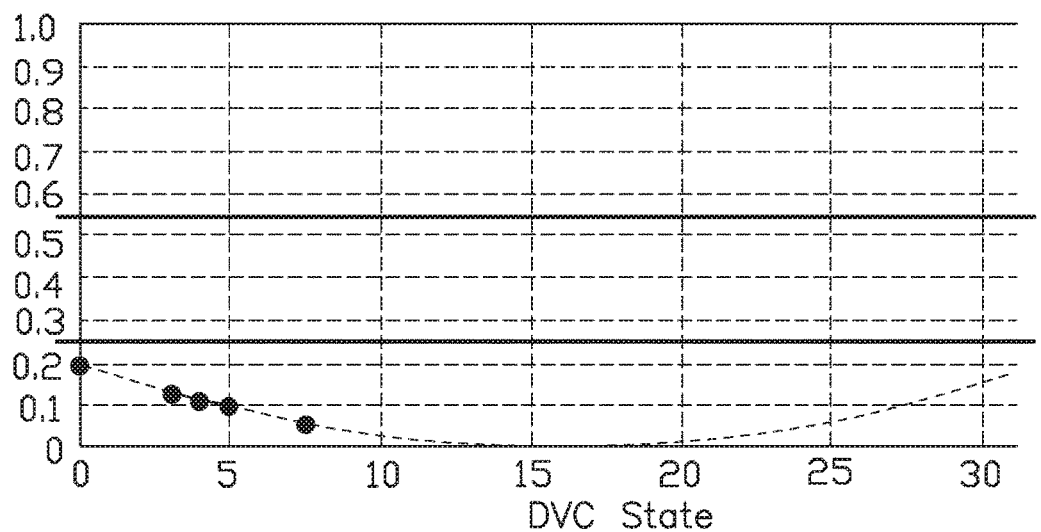

In another example, all measured DVC states are lower than the lower limit as shown in FIG. 19. If >0, the algorithm will report optimized state not found and set Smin−1 to be the next DVC state to measure. If Smin=0, the algorithm will report optimized state=0 and exit. New threshold will be set according to reflection coefficient magnitude as DVC State 0. The old threshold is too high.

Figure 20:
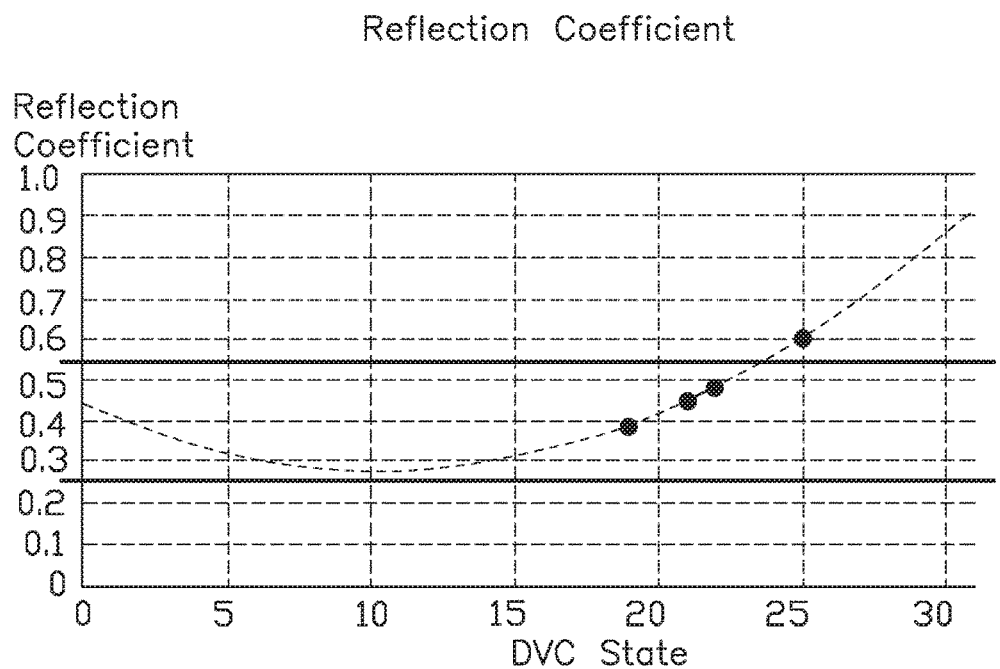
Figure 21:
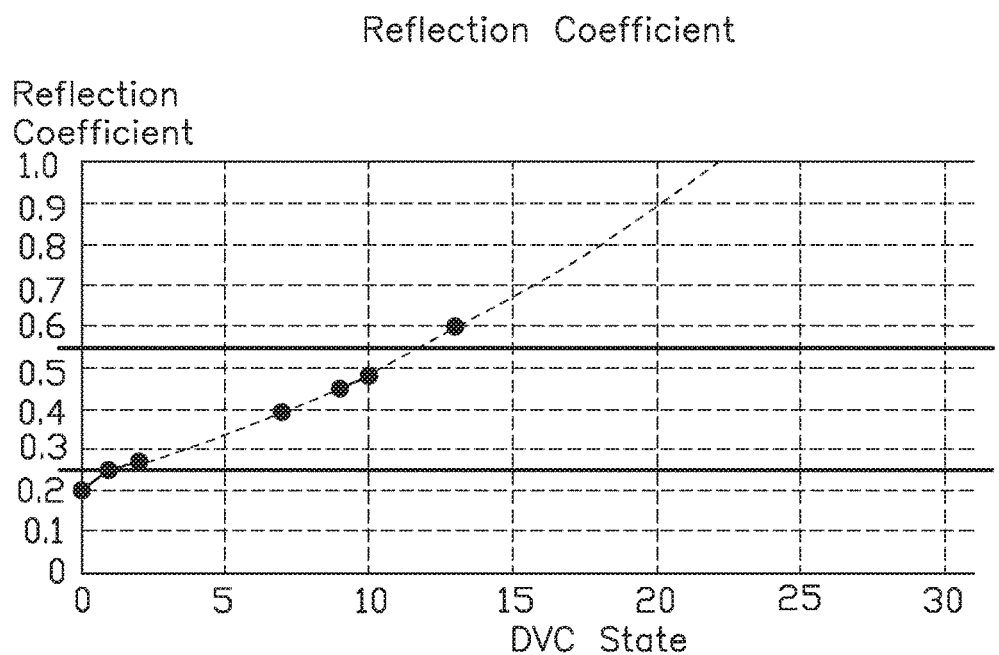

In one example, all measured DVC states at the right side of the slope as shown in FIG. 20 (i.e., Smin>0). The algorithm will report optimized state not found and set Smin−1 to be the next DVC state to measure. When Smin=0 as shown in FIG. 21, the algorithm will report optimized state=0 and exit. New threshold will be set according to reflection coefficient magnitude as DVC State 0. The DVC capacitance is not low enough to tune the antenna up in this case.

Figure 22:
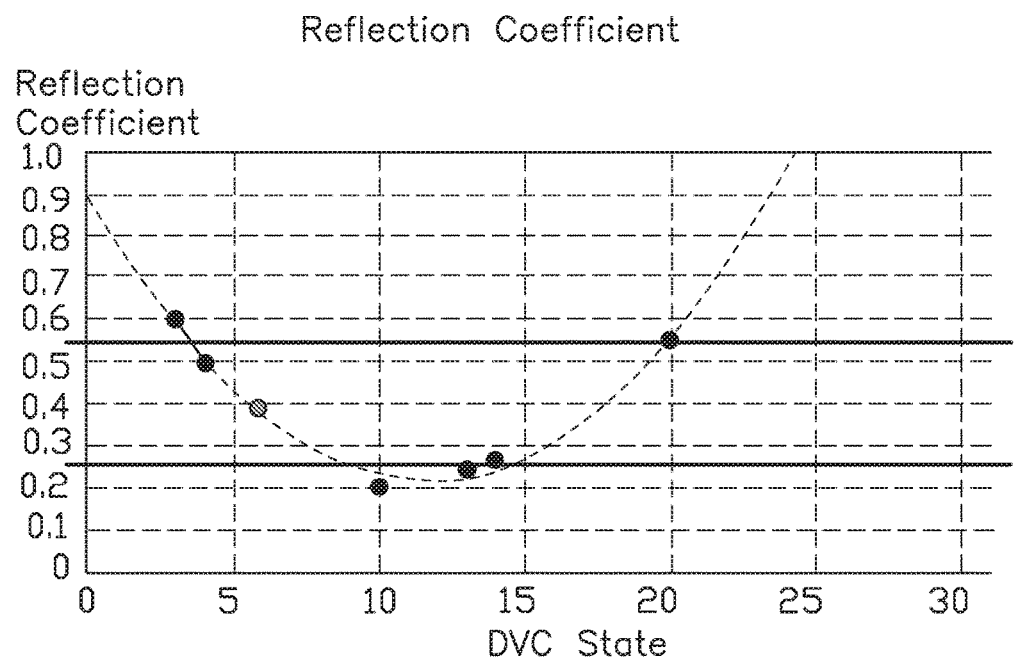

In one example, the minimum reflection coefficient magnitude DVC state is found. As shown in FIG. 22, there are measured DVC states in the threshold range. The algorithm interpolates the optimized state by the fitting parabolic equation. In FIG. 22 case, DVC State #6 is the calculated best state. DVC state #6 is not measured in FIG. 17 case, so the algorithm will report optimized state not found and set DVC state #6 to be the next DVC state to measure. If DVC state #6 was measured, then the algorithm will return DVC state #6 as the optimized state and exit.

Figure 23:
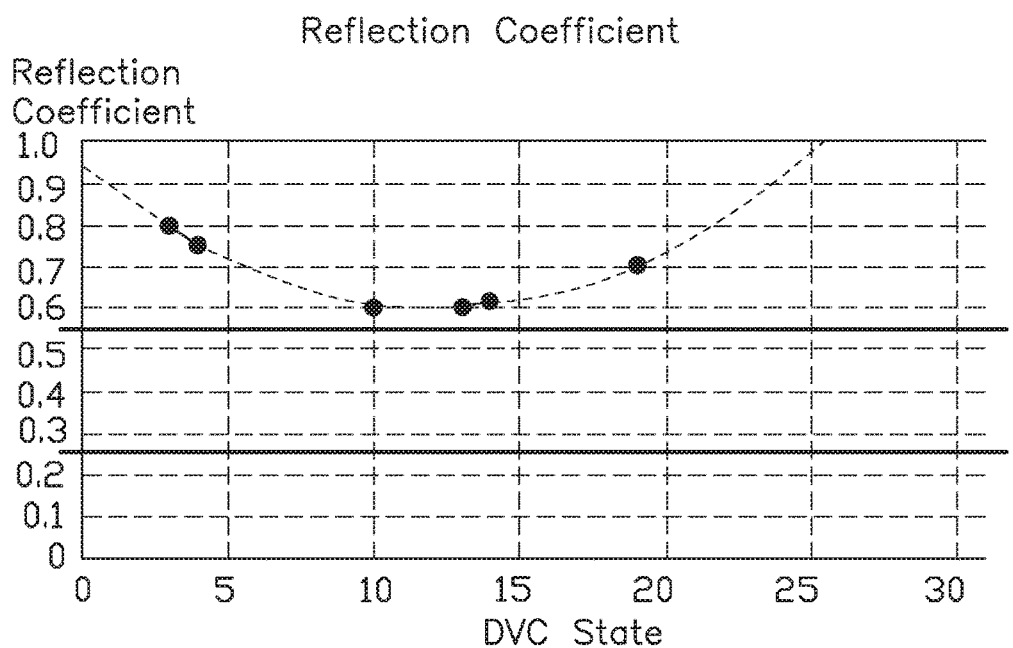

In one example, all of the measured states have a reflection coefficient magnitude that is higher than the upper limit as shown in FIG. 23. In such a situation, the algorithm will report optimized state=Di and exit. New threshold will be set according to the magnitude of the reflection coefficient at optimized DVC State. The old threshold is too low.

Figure 24:
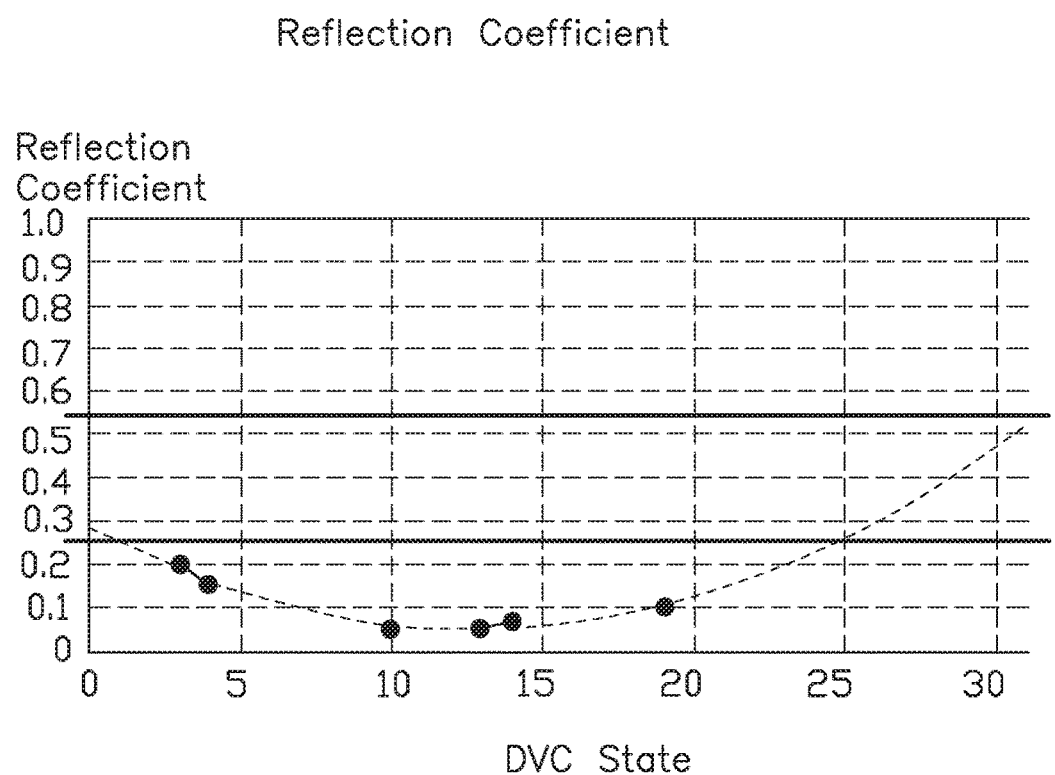

In another example, all measured states have a reflection coefficient magnitude that is lower than the lower limit as shown in FIG. 24. If Smin>0, the algorithm will report optimized state not found and set Smin−1 to be the next DVC state to measure. If Smin=0, the algorithm will report optimized state=0 and exit. A new threshold will be set according to reflection coefficient magnitude as DVC State 0. The old threshold is too high.

Figure 9:
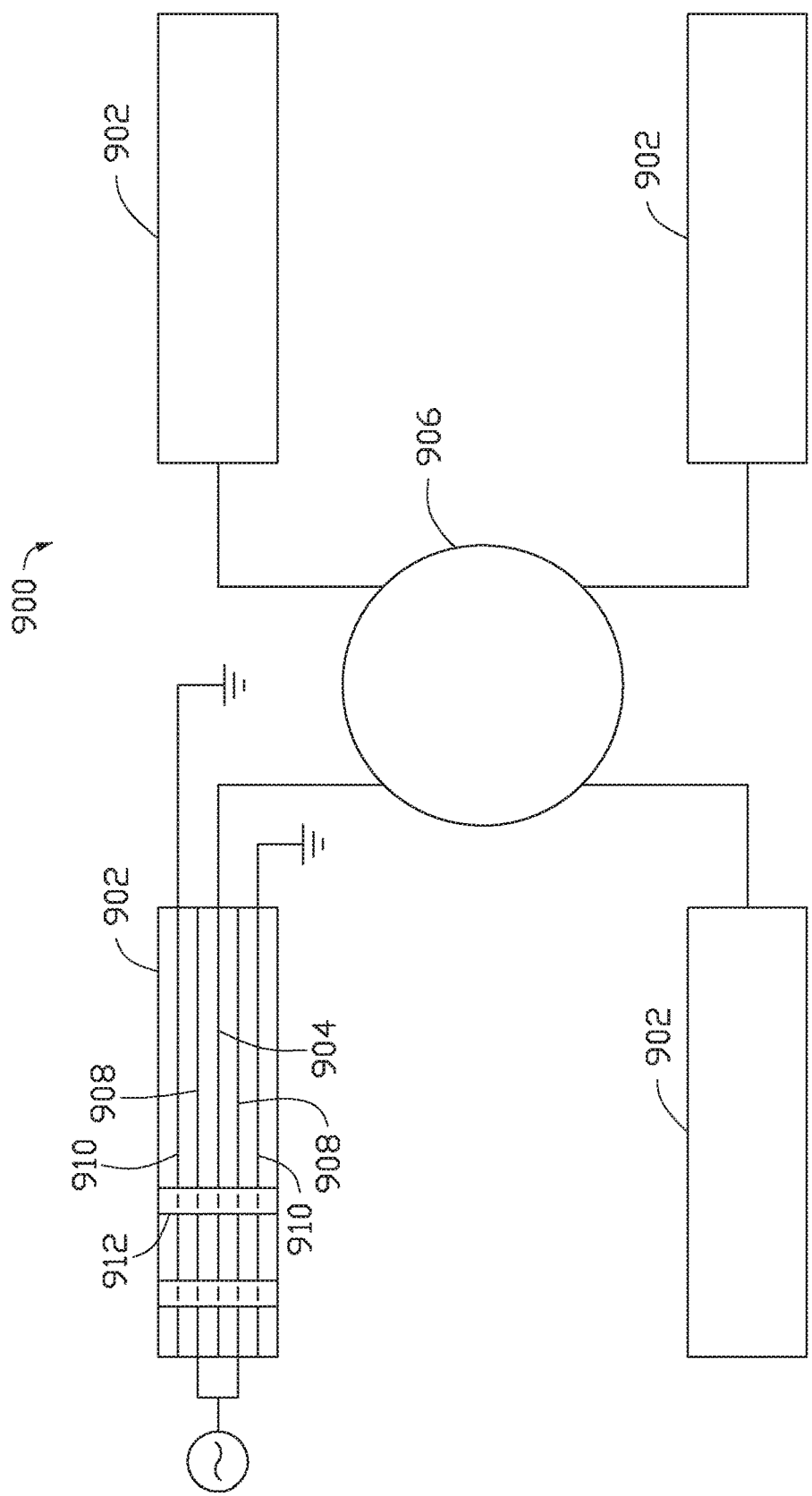
FIG. 9 is a schematic illustration of a digital variable capacitor (DVC) as one of many possible instantiations of a variable reactance, according to one embodiment.

The DVC used to tune the antenna contains a MEMS device. FIG. 9 is a schematic illustration of a Micro Electro Mechanical System (MEMS) based Digital Variable Capacitor, DVC 900, according to one embodiment. The MEMS DVC includes a plurality of cavities 902 that each have an RF electrode 904 that is coupled to a common RF bump 906. Each cavity has one or more pull-in or pull-down electrodes 908 and one or more ground electrodes 910. A switching element 912 moves from a position far away from the RF electrode 904 and a position close to the RF electrode 904 to change the capacitance in the MEMS DVC 900. The MEMS DVC 900 has numerous switching elements 912 and therefore has a large variable capacitance range that can be applied/removed from the antenna aperture in order to maintain a constant resonant frequency and compensate for changes in the electrical characteristics of an antenna that is under the influence of environmental changes or head/hand effect. The MEMS DVC 900 is, in essence, a collection of multiple individually controlled MEMS elements.

Figure 10A:
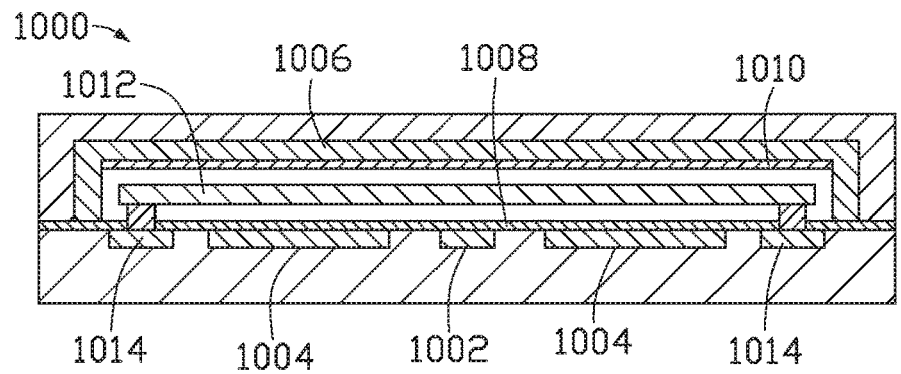
FIGS. 10A-10C are schematic cross-sectional illustrations of a microelectromechanical (MEMS) device that can be utilized as variable reactance according to one embodiment.
Figure 10B:
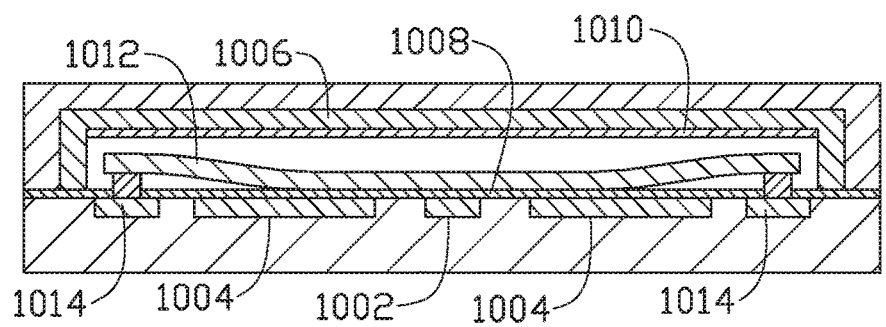
Figure 10C:
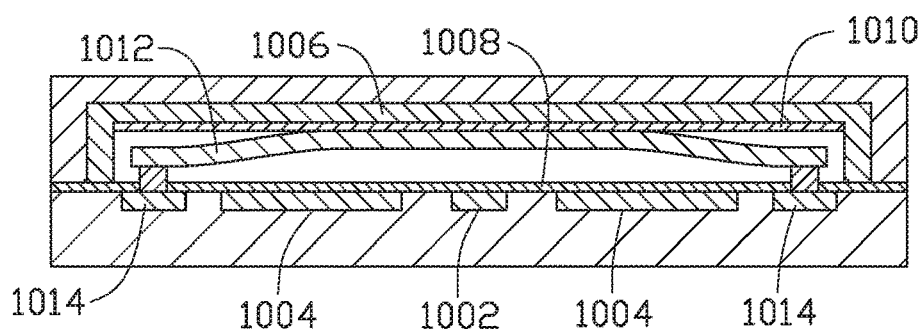

FIGS. 10A-10C are schematic cross-sectional illustrations of a single MEMS element 1000 that can create the plurality of switching elements 912 in the plurality of cavities 902 in MEMS DVC 900, according to one embodiment. The MEMS element 1000 includes an RF electrode 1002, pull-down electrodes 1004, a pull-up electrode 1006, a first dielectric layer 1008 overlying the RF electrode 1002 and pull-down electrode 1004, a second dielectric layer 1010 overlying the pull-up electrode 1006, and a switching element 1012 that is movable between the first dielectric layer 1008 and the second dielectric layer 1010. The switching element 1012 is coupled to grounding electrodes 1014. As shown in FIG. 10B, the MEMS element 1000 is in the maximum capacitance position when the switching device 1012 is closest to the RF electrode 1002. As shown in FIG. 10C, the MEMS element 1000 is in the minimum capacitance position when the switching device 1012 is furthest away from the RF electrode 1002. Thus MEMS element 1000 creates a variable capacitor with two different capacitance stages, and integrating a plurality of such MEMS element 1000s into a single MEMS DVC 900 is able to create a DVC with great granularity and capacitance range to effect the reactive aperture tuning that is required to maintain a constant resonant frequency, and compensate for changes in the electrical characteristics of an antenna that is under the influence of environmental changes or head/hand effect.

By adjusting the capacitive or inductive characteristics of an antenna's aperture (resonating circuit) using a variable reactance like a DVC, the drop in signal strength that is oftentimes caused by head/hand and other environmental effects can be eliminated. Rather than trying to correct the resulting impedance mismatch, simply adjusting the reactive loading of the device's antenna can directly compensate for the head/hand effect.

While the foregoing is directed to embodiments of the present disclosure, other and further embodiments of the disclosure may be devised without departing from the basic scope thereof, and the scope thereof is determined by the claims that follow.

What is claimed is:

1. A device, comprising:
   a radio front end;
   an antenna;
   a power coupler inserted between the antenna and the front end; and
   a reactance altering device coupled to the antenna, wherein the reactance altering device is capable of adjusting a resonant frequency of the antenna.

2. The device of claim 1, wherein the reactance altering device is a variable capacitor.

3. The device of claim 2, wherein the variable capacitor comprises a plurality of microelectromechanical capacitors, one or more a variable ferro-electric capacitor, semiconductor switched capacitors or MEMS switched capacitors.

4. The device of claim 1, wherein the wherein the reactance altering device is a variable inductor.

5. The device of claim 4, wherein the variable inductor comprises a network of inductors and variable microelectromechanical capacitors, semiconductor switched inductors or MEMS switched inductors.

6. The device of claim 1, wherein the device is a cellular telephone, a wearable device or a device that utilizes one or more antennas to support wireless communication.

7. A method of using a device, comprising:
   detecting a change in capacitance of the device;
   calculating a reflection coefficient versus digital variable capacitor curve;
   finding the optimized state; and
   setting the digital variable capacitor to the optimized state, wherein setting the digital variable capacitor to the optimized state comprises changing a resonant frequency of the device.

8. The method of claim 7, wherein the detecting comprises detecting a decrease in capacitance.

9. The method of claim 8, further comprising increasing the digital variable capacitor state.

10. The method of claim 9, wherein reducing the digital variable capacitor state comprises increasing the capacitance.

11. The method of claim 7, wherein the detecting comprises detecting an increase in capacitance.

12. The method of claim 11, further comprising reducing the digital variable capacitor state.

13. The method of claim 12, wherein reducing the digital variable capacitor state comprises decreasing the capacitance.

14. The method of claim 7, wherein finding the optimized state comprises taking a finite number of measurements, wherein the finite number of measurements are all taken in a time period of less than one second.

15. The method of claim 14, further comprising determining a measured state distribution of the finite number of measurements.

* * * * *